Patented Aug. 3, 1943

2,325,589

UNITED STATES PATENT OFFICE 2,325,589

ACETALDEHYDE-FORMALDEHYDE CONDENSATION PRODUCT

Edward A. Bried, Elsmere, Del., assignor to Hercules Powder Company, Wilmington, Del., a corporation of Delaware No Drawing. Application March 8, 1941, Serial No. 382,341

5 Claims. (Cl. 260—615)

This invention relates to a method of preparing pentaerythritol and dipentaerythritol and more particularly to a method which yields a higher proportion of dipentaerythritol than heretofore.

It is known to prepare a mixture of pentaerythritol and dipentaerythritol by the condensation of acetaldehyde with formaldehyde in the presence of a fixed alkali. See article of Friederich et. al., Ber. 63, 2681 (1930). However the proportion of dipentaerythritol in the product has not been desirably high. Thus, in Friederich et. al. the product contained as a maximum 15% of dipentaerythritol and this figure was for the product after purification with hot alcohol which increases the concentration of dipentaerythritol due to the preferential solvent action of alcohol on pentaerythritol. Therefore, the crude product of Friederich et al. contained a considerably lower percentage of dipentaerythritol.

Since dipentaerythritol has become commercially important because of the desirable properties of its resinous esters, a method of improving the direct yield of dipentaerythritol in the manufacture of pentaerythritol is desirable. It is known that in the preparation of pentaerythritol some dipentaerythritol is frequently also produced. See U. S. 2,186,272; 2,004,010; 2,206,379; also Br. 440,891 which shows washing and scouring the crude pentaerythritol product and filtering to separate pentaerythritol from an impurity alleged to be dipentaerythritol. However, the yield of dipentaerythritol is too low in the known processes.

It is the object of the present invention to produce dipentaerythritol in high concentration in admixture with pentaerythritol, without any intermediate concentrating step to remove pentaerythritol from the mixture, in other words directly.

Another object is to provide a method whereby a higher yield of dipentaerythritol is obtained in the crude directly-obtained product.

Another object is to provide a method which enables positive control of the yield of dipentaerythritol.

Still other objects will appear hereinafter.

I have discovered that higher concentration of dipentaerythritol in the crude directly-obtained product may be had by carrying out the condensation of the formaldehyde with the acetaldehyde in the presence of a limited amount of water, namely not more than 15 mols of water per mol of acetaldehyde. A product in which the concentration of dipentaerythritol is as high as 35% to 40% is readily obtained in this way.

The process may be carried out by forming an initial reaction mixture of acetaldehyde, formaldehyde, fixed alkali, and up to 15 mols of free water per mol of acetaldehyde. This mixture is allowed to react by maintenance at a temperature not above 25° C. for a substantial period, say 24 hours, whereupon the reaction mixture is treated to recover the pentaerythritol and dipentaerythritol therein. Where calcium hydroxide is used as the fixed alkali, this recovery may conveniently be effected by acidifying with less than the theoretical quantity of sulfuric acid and completing the neutralization with oxalic acid, filtering off the precipitated calcium salts, and recovering the crude pentaerythritol-dipentaerythritol mixture high in dipentaerythritol from the filtrate. This crude mixture may be resolved in any known manner into relatively pure pentaerythritol and dipentaerythritol if desired.

The molar ratio of formaldehyde to acetaldehyde employed may vary from 1 to 1 to 8 to 1. I prefer to use a 3 to 1 molar ratio because this gives highest yields of product and highest percentages of dipentaerythritol in the product.

The formaldehyde is conveniently employed in the form of the commercially available aqueous solution known as formalin which contains about 35% by weight of actual formaldehyde. Since this solution presents three mols of water per mol of actual formaldehyde, it cannot be used for formaldehyde-acetaldehyde mol ratios above 5 to 1, without introducing more than 15 mols of water per mol of acetaldehyde. Accordingly, in order to use mol ratios of formaldehyde to acetaldehyde which are higher than 5 to 1, I find it necessary either to use a more concentrated formaldehyde solution or to add the calcium oxide to the reaction mixture which reduces the amount of free water by combining therewith. Either of these expedients or both may be resorted to in order to have present not over 15 mols of water per mol of acetaldehyde, when using a formaldehyde-acetaldehyde ratio above 5 to 1.

Preferably, the initial reaction mixture contains as a minimum 9 mols of water per mol of acetaldehyde. Presence of less water than this results in a diminished yield.

As the fixed alkali I may use either the alkali metal hydroxides such as sodium, potassium or lithium hydroxides, or the alkaline earth metal hydroxides such as calcium, barium or strontium hydroxides. I prefer to use calcium hydroxide which may be in the form of a paste or slurry formed by slaking calcium oxide with an excess of water. Preferably the fixed alkali is added gradually to the pre-mixed acetaldehyde and formalin, with control of temperature so as to prevent its rising above 25° C. and preferably above 20° C.

The amount of alkali is preferably in the neighborhood of one-half mol per mol of acetaldehyde, though larger amounts may be used.

In a preferred embodiment, therefore, I use a 3 to 1 formaldehyde-acetaldehyde molar ratio, add no water other than that in the formalin and a slight excess used to slake the calcium oxide, keep the temperature from rising above 20° C. during the introduction of the calcium hydroxide and from rising about 25° C. during the subsequent reaction, and use one-half mol of calcium hydroxide per mol of acetaldehyde.

If desired, there may be present in the reaction mixture a Cannizzaro catalyst such as Raney nickel as is disclosed in the copending application of R. F. Cox, Serial No. 343,176, filed June 29, 1940. However, such a catalyst is preferably not used because its presence acts as an inhibitor for formation of dipentaerythritol.

Below are given several specific examples illustrative of the invention.

In these examples the percentage of dipentaerythritol in the product was determined by the dibenzal method as follows:

Transfer about 1 g. of the product, dried two hours at 110° C., and accurately weighed, to a 125 ml. Erlenmeyer flask, and dissolve in 10 ml. of water by heating. Cool and add 10 ml. of methanol, 3 ml. of benzaldehyde and 2 ml. of concentrated HCl. Stopper, shake well, and let stand overnight.

Transfer the precipitated dibenzal of pentaerythritol to a weighed glass filter crucible and filter by suction. Then wash with 100 ml. of a 1:1 mixture of methanol and water in 5–10 ml. portions, stirring the precipitate well with each portion. Air dry the precipitate and then dry it in an oven at 110° C. for three hours. Cool and weigh. The dried dibenzal should melt not lower than 155° C. Calculation: Add 0.05 g. (the amount of the dibenzal remaining in solution and lost in washing) to the weight of the pentaerythritol dibenzal. Use this as the wt. of dibenzal in the following equation:

Per cent dipentaerythritol=

$$\frac{\text{Wt. of sample} - (0.4359)\,(\text{wt. of dibenzal})}{\text{Wt. of sample}} \times 100$$

*Example 1*

|  | Parts by weight | Relative molar amounts |
| --- | --- | --- |
| Acetaldehyde (C. P.) | 88 | 1 mol. |
| Formalin (35% HCHO) | 514 | 3 mols HCHO. 9.26 mols H$_2$O. |
| Calcium oxide slaked in water | 56 / 200 | 0.5 mol Ca(OH)$_2$. 5.05 mols water. |
| Total free water present in reaction mixture= |  | 14.31 mols. |

The acetaldehyde and formalin were admixed at a temperature of not over 20° C. The slurry of calcium hydroxide formed by slaking the calcium oxide in the 200 parts of water, and which comprised 74 parts of calcium hydroxide and 182 parts of water, was then added slowly in small quantities with stirring while preventing the temperature from rising above 20° C. The mixture was stirred for 24 hours and kept from rising above 20° C. throughout. It was then acidified with less than the theoretical quantity of sulfuric acid and the balance with oxalic acid. The precipitate of calcium salts was removed by filtration. The filtrate was then concentrated in vacuum and exhaustively worked for crystalline material in the usual way (as for example by the method of Organic Synthesis, Vol. IV, page 53 (1925).)

The entire crystalline mixture of pentaerythritol and dipentaerythritol as thus obtained amounted to 100 parts by weight and analyzed 36% dipentaerythritol. This figure was for the directly obtained crystals without purification or treatment in any manner, prior to analysis, which would change the relative amounts of pentaerythritol and dipentaerythritol in the mixture.

A run in which all conditions were identical with Example 1 except that 53.8 mols of water per mol of acetaldehyde (conventional proportions) instead of 14.31 mols were present gave 124 parts by weight of a product analyzing only 19.0% dipentaerythritol.

The use of a ratio of formaldehyde to acetaldehyde other than 3:1 gives a lower yield of product and a lower proportion of dipentaerythritol in the product. The following is an example of such use of a ratio of 4:1.

*Example 2*

|  | Relative molar amount, mols |
| --- | --- |
| Acetaldehyde | 1 |
| Formaldehyde (actual) | 4 |
| Calcium hydroxide | 0.5 |
| Water | 12.2 |

The ingredients were reacted exactly as in Example 1. The directly-obtained product contained 21.5% of dipentaerythritol. The yield of product was 46.5% based on the acetaldehyde.

From the foregoing it will be seen that the process of the present invention, by operating in a concentrated aqueous solution, together with temperature control, and preferably also by using a 3:1 formaldehyde-acetaldehyde ratio, brings about a surprisingly high yield of dipentaerythritol which is becoming increasingly important as a raw material in the organic chemical field. Moreover, by carrying out the reaction at a lower temperature, I obtain a product of lighter color and decrease the extent of purification required to obtain white crystals.

It will be understood that the details and examples hereinbefore set forth are illustrative only and that the invention as broadly described and claimed is in no way limited thereby.

What I claim and desire to protect by Letters Patent is:

1. A process of preparing pentaerythritol and dipentaerythritol which consists in commingling 88 parts by weight of acetaldehyde and 514 parts by weight of about 35% by weight aqueous formaldehyde at a temperature not above 20° C., slowly introducing a slurry of 74 parts by weight of calcium hydroxide in about 182 parts by weight of water while preventing the temperature from rising above 20° C., maintaining the mixture at not above 20° C. for several hours, acidifying the reaction mixture with less than the theoretical amount of sulfuric acid and completing neutralization with oxalic acid, filtering, and recovering pentaerythritol and dipentaerythritol from the filtrate.

2. A process of preparing directly a mixture of pentaerythritol and dipentaerythritol containing a high concentration of dipentaerythritol which comprises condensing acetaldehyde with formaldehyde in the molar ratio of about 3 mols of formaldehyde to each mol of acetaldehyde, in the presence of a fixed alkali and from about 9 mols to about 15 mols of water per mol of acetaldehyde, while maintaining the reaction temperature at below about 25° C.

3. A process of preparing directly a mixture of pentaerythritol and dipentaerythritol containing a high concentration of dipentaerythritol which comprises condensing acetaldehyde with formaldehyde in the molar ratio of about 3 mols of formaldehyde to each mol of acetaldehyde, in the presence of about ½ mol of a fixed alkali and from about 9 mols to about 15 mols of water per mol of acetaldehyde, while maintaining the reaction temperature at below about 25° C.

4. A process of preparing directly a mixture of pentaerythritol and dipentaerythritol containing a high concentration of depentaerythritol which comprises condensing acetaldehyde with formaldehyde in the molar ratio of about 3 mols of formaldehyde to each mol of acetaldehyde, in the presence of about ½ mol of calcium hydroxide and from about 9 mols to about 15 mols of water per mol of acetaldehyde, while maintaining the reaction temperature at below about 25° C.

5. A process of preparing directly a mixture of pentaerythritol and dipentaerythritol containing a high concentration of dipentaerythritol which comprises commingling acetaldehyde with formaldehyde in the molar ratio of about 3 mols of formaldehyde to each mol of acetaldehyde at a temperature not above about 25° C., then slowly introducing about ½ mol of a fixed alkali per mol of acetaldehyde, the amount of water present in the reaction mixture being within the range of about 9 mols to about 15 mols per mol of acetaldehyde, maintaining the reaction mixture at below about 25° C. until substantially complete reaction is effected, acidifying the reaction mixture and recovering a mixture of pentaerythritol and dipentaerythritol containing a high concentration of dipentaerythritol.

EDWARD A. BRIED.